(12) United States Patent
Shime

(10) Patent No.: US 7,995,432 B2
(45) Date of Patent: Aug. 9, 2011

(54) OPTICAL DISK REPRODUCTION APPARATUS AND OPTICAL DISK REPRODUCTION METHOD

(75) Inventor: Isao Shime, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 189 days.

(21) Appl. No.: 12/458,911

(22) Filed: Jul. 27, 2009

(65) Prior Publication Data
US 2010/0020651 A1    Jan. 28, 2010

(30) Foreign Application Priority Data

Jul. 28, 2008   (JP) .................................. 2008-193311

(51) Int. Cl.
*G11B 7/00* (2006.01)
(52) U.S. Cl. ................. 369/44.36; 369/124.12; 369/47.1
(58) Field of Classification Search ................ 369/44.41, 369/44.42, 44.34, 44.36, 44.32, 44.35, 124.1, 369/124.12, 124.15, 47.1
See application file for complete search history.

(56) References Cited

U.S. PATENT DOCUMENTS

| 6,392,967 | B1 * | 5/2002 | Nakayama et al. | ........ 369/44.34 |
| 7,224,648 | B2 * | 5/2007 | Takaba | ...................... 369/44.36 |
| 2007/0217317 | A1 | 9/2007 | Saito | |

FOREIGN PATENT DOCUMENTS

JP    2007-257677    10/2007

* cited by examiner

*Primary Examiner* — Nabil Z Hindi
(74) *Attorney, Agent, or Firm* — McGinn IP Law Group, PLLC

(57) ABSTRACT

Deterioration of error rate at reproduction time is prevented even if a photodetector with a poor characteristic is included. An optical pickup unit (3) is provided with 4 photodetectors. A controller (13) obtains an error correction result of a reproduced signal, which is reproduced based on an RF signal generated while changing combination of the 4 photodetectors at startup time, and determines a combination at reproduction time in accordance with the obtained error correction result, to be given to an RF amplifier unit (10). The controller (13) is provided with a counter that counts for a fixed time period the error correction result per combination of the photodetectors, a comparator that compares a count result of the counter with a threshold set in advance, and an output controller that judges whether or not to use a combination of the photodetectors based on a comparison result of the comparator and performs change control of the combination of the photodetectors, of which there is a plurality. At reproduction time, control is performed to obtain the reproduced signal from output outside of the photodetector with the poor characteristic.

9 Claims, 10 Drawing Sheets

FIG. 4

TRUTH TABLE FOR DECODE CIRCUIT 301

| RF GENERATION SELECTION SIGNAL | DEC11 | DEC12 | DEC13 | RF SIGNAL |
|---|---|---|---|---|
| 01 | H | L | H | (SA+SC)*2 |
| 10 | L | H | H | (SB+SD)*2 |
| 00 | H | H | L | SA+SB+SC+SD |

FIG. 9

TRUTH TABLE FOR DECODE CIRCUIT 901

| RF GENERATION SELECTION SIGNAL | DEC21 | DEC22 | DEC23 | DEC24 | DEC25 | RF SIGNAL |
|---|---|---|---|---|---|---|
| 001 | L | H | H | H | H | (SB+SC+SD)*4/3 |
| 010 | H | L | H | H | H | (SA+SC+SD)*4/3 |
| 011 | H | H | L | H | H | (SA+SB+SD)*4/3 |
| 100 | H | H | H | L | H | (SA+SB+SC)*4/3 |
| 000 | H | H | H | H | L | SA+SB+SC+SD |

OPTICAL DISK REPRODUCTION APPARATUS AND OPTICAL DISK REPRODUCTION METHOD

TECHNICAL FIELD

Reference to Related Application

This application is based upon and claims the benefit of the priority of Japanese patent application No. 2008-193311, filed on Jul. 28, 2008, the disclosure of which is incorporated herein in its entirety by reference thereto.

The present invention relates to an optical disk reproduction apparatus and an optical disk reproduction method, and in particular, to reproduction technology for a reproduced signal with regard to a detection signal of a photodetector.

BACKGROUND

In order to access a desired track on an optical disk such as a CD, a DVD, or the like, in which storage and reproduction tracks are formed in a spiral shape or a circular shape, an optical disk reproduction apparatus moves an optical pickup module in a radial direction and a focus direction of a lens, to perform reading and writing. The optical pickup module is generally provided with 4 photodetectors, and based on photodetector detection signals respectively obtained from the 4 photodetectors, access to tracks and reading and writing of data is performed.

For example, as shown in Patent Document 1, in an optical disk reproduction apparatus, when a reproduced signal is generated according to a DVD-RAM format, in a case where an RF signal of a header part written to a track is generated, generation takes place based on a detection signal from one side, divided in a track direction, of a 4-division photodetector, or a detection signal from the other side. The RF signal of a data portion written to a track is generated based on a signal sum of 4 detection signals.

Furthermore, in reproduction of an optical disk of a conventional CD/CD-ROM format, similar to reproduction of the DVD-RAM format, generation is normally based on a signal sum of detection signals of the 4 photodetectors.
[Patent Document 1]
JP Patent Kokai Publication No. JP-P2007-257677A

SUMMARY

The entire disclosure of Patent Document 1 is incorporated herein by reference thereto.
The following analysis is given by the present invention.
The optical disk reproduction apparatus market for CD/CD-ROM reproduction apparatuses has reached maturation, and with cost reduction and the like, pickup modules with relatively poor characteristics have been commercialized. These types of pickup modules include modules having signals with poor sensitivity (poor quality, or much jitter), among a plurality of photodetector signals. Normally, an optical pickup module and reproduction LSI circuit form separate modules, and even with a pickup module having a relatively poor characteristic, the reproduction LSI circuit is required to reproduce without a deteriorating error rate.

For example, with regard to 4 photodetector detection signals SA to SD, the photodetector detection signals SA, SB, and SD have normal waveforms, but the photodetector detection signal SC has a poor characteristic compared to the others. In this type of case, with conventional optical disk apparatuses, since a sum of signals is generated, a component with a poor characteristic is included in a reproduction RF signal. In such a type of CD/CD-ROM apparatus, in a case where a chucking property is poor when disk loading is performed, or when reproduction is carried out with a disk having a large distortion, there is a risk of disk surface wobble occurring and of noise being generated in audio data. A main reason for this is that since a focus servo, which holds constant a distance between a lens and a recording surface of the disk, cannot follow the surface wobble, amplitude of a photodetector detection signal attenuates, and amplitude of an RF signal decreases. Therefore, the disk signal component with a poor characteristic becomes pronounced, and since quality of the RF signal deteriorates, noise is generated in the audio data.

According to a first aspect of the present invention, there is provided an optical disk reproduction apparatus comprising: a plurality of photodetectors, an RF amplifier unit that selects a combination of output signals of the plurality of photodetectors to generate an RF signal, and a controller that obtains an error correction result of a reproduced signal, which is reproduced based on the RF signal generated while changing the combination at startup time, and determines the combination at reproduction time in accordance with the obtained error correction result, to be given to the RF amplifier unit.

According to another aspect of the present invention, there is provided an optical disk reproduction method for an optical disk reproduction apparatus that selects a combination of output signals of a plurality of photodetectors to generate an RF signal, and outputs a reproduced signal, which is reproduced based on the RF signal. The method comprises: obtaining an error correction result of the reproduced signal, which is reproduced based on the RF signal while changing the combination of output signals of the plurality of photodetectors at startup time, determining the combination at reproduction time in accordance with the obtained error correction result, and outputting the reproduced signal obtained based on the determined combination.

The meritorious effects of the present invention are summarized as follows.

According to the present invention, since a characteristic of a photodetector is judged at the startup time, and a reproduced signal is generated from output other than that of a photodetector with a poor characteristic at the reproduction time, it is possible to prevent deterioration of the error rate at reproduction time, even if the photodetector with a poor characteristic is included.

BRIEF DESCRIPTIONS OF THE DRAWINGS

FIG. 4 is a truth table for a decode circuit according to the first exemplary embodiment of the present invention.

FIG. 9 is a truth table for a decode circuit according to the second exemplary embodiment of the present invention.

PREFERRED MODES

Figure 1:
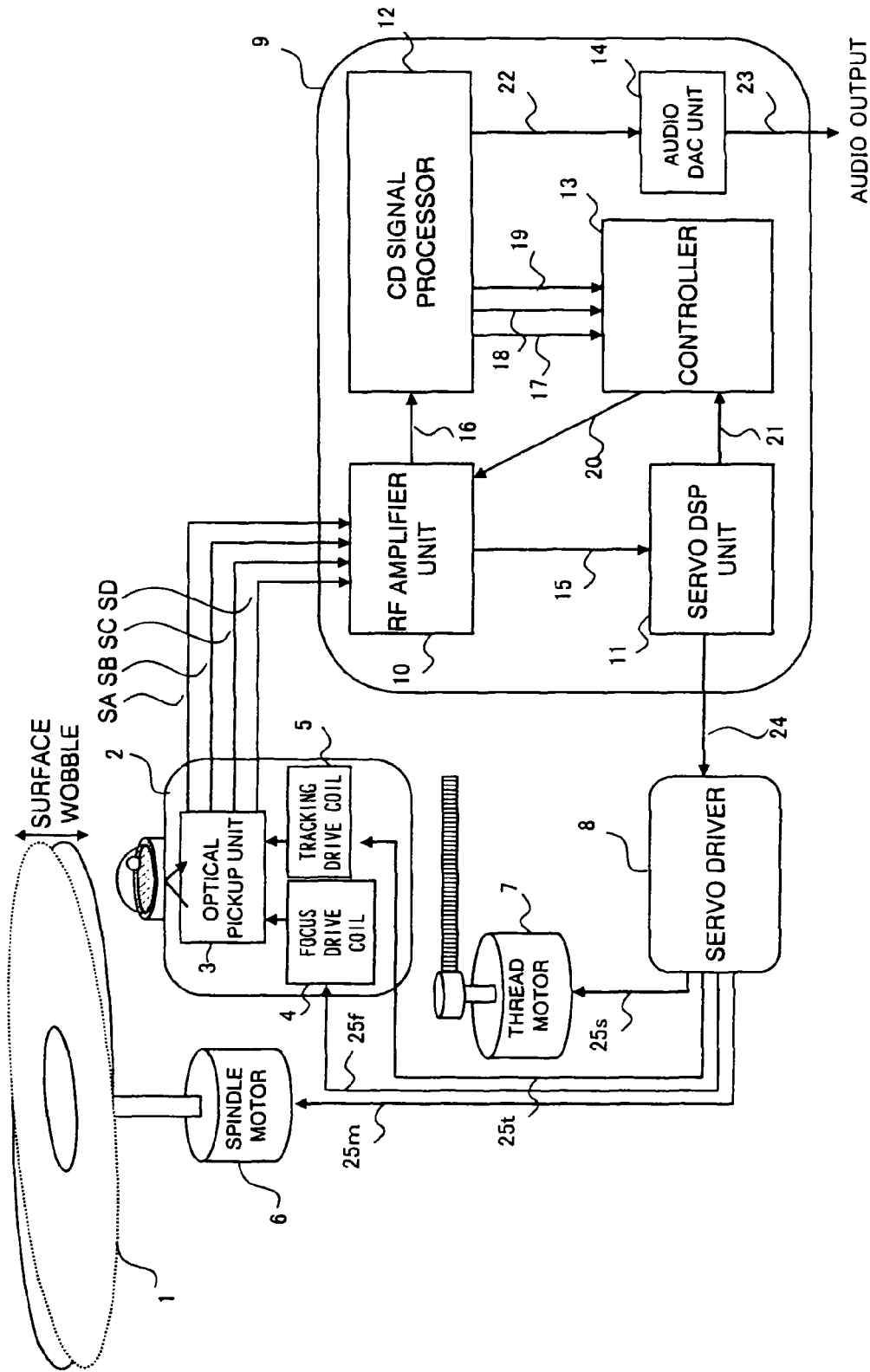
FIG. 1 is a drawing showing a configuration of an optical disk reproduction apparatus according to a first exemplary embodiment of the present invention.

An optical disk reproduction apparatus according to a mode of the present invention is provided with a plurality of photodetectors (built-in at 3 in FIG. 1). The optical disk reproduction apparatus changes a combination of the plurality of photodetectors at startup time to generate an RF signal, and counts, for a fixed time period, an error correction result of a reproduced signal generated based on the RF signal, per combination of the photodetectors. A count result is compared with a threshold that is set in advance, and a judgment is made of a combination of photodetectors with a poor characteristic. Furthermore, the reproduced signal is obtained from an output other than any of a photodetector(s) with the poor characteristic.

The optical disk reproduction apparatus of the present invention is provided with a controller (13 in FIG. 1) that obtains an error correction result of the reproduced signal generated based on the RF signal while changing a combination at startup time, and determines a combination at reproduction time based on the obtained error correction result, to be given to an RF amplifier unit (10 in FIG. 1). The controller may be provided with a counter (29 in FIG. 2) that counts for a fixed time period the error correction result per combination of photodetectors, a comparator (37 in FIG. 2) that compares a count result of the counter with a threshold set in advance, and an output controller (40 in FIG. 2) that judges whether or not to use a combination of the photodetectors based on a comparison result of the comparator and performs change control of the combination of the plurality of photodetectors.

The plurality of photodetectors may be formed of 4 photodetectors, with 2 being arranged on each of an inner circumferential side and an outer circumferential side of a track; the combination at reproduction time is formed by selecting whichever of either a sum of output signals of 2 among the 4 photodetectors, or a sum of output signals of the other 2 photodetectors has fewer error corrections; and the RF amplifier unit, for a case in which all of the 4 photodetectors are selected, may double the degree of amplification of the output signals of the photodetectors.

The plurality of photodetectors may be formed of 4 photodetectors, with 2 each being arranged on an inner circumferential side and on an outer circumferential side of a track, the combination at reproduction time is formed by selecting 3 photodetectors from those that have fewer error corrections of the reproduced signals, and the RF amplifier unit, for a case in which all of the 4 photodetectors are selected, may increase the degree of amplification of the output signals of the photodetectors by a factor of 4/3.

By counting a SUBQ synchronization signal as input, reproduction time of one disk rotation may be measured to obtain a fixed time period, and the counter may count the number of errors of a C1C2 error signal in the fixed time period as an error correction result.

According to the above type of optical disk reproduction apparatus, it is possible to prevent error rate deterioration at audio reproduction time, even if a characteristic of 1 or 2 signal components, among signals of the plurality of photodetectors outputted from an optical pickup module is poor. A reason for this is that the characteristic of the photodetectors is judged at startup time and reproduced signals are generated from output, other than from that of a photodetector with a poor characteristic at reproduction time.

Furthermore, when there is amplitude attenuation of the RF signal generated at reproduction time of a disk with a large surface wobble, it is possible to eliminate deterioration of reproduction error rate. A reason for this is that a characteristic of the photodetectors is judged at startup time, and switching is performed to generate reproduced signals from output other than from that of a photodetector with a poor characteristic in a time period in which amplitude attenuation of the RF signal occurs at reproduction time.

In addition, even if a characteristic of 1 or 2 signal components, among signals of the plurality of photodetectors outputted from the optical pickup module, is poor, there is no necessity to replace the optical pickup module. A reason for this is that a characteristic of the photodetectors is judged at startup time and reproduced signals are generated from output other than from that of a photodetector with a poor characteristic at reproduction time.

A detailed description is given below in accordance with exemplary embodiments, making reference to the drawings.

EXEMPLARY EMBODIMENT 1

FIG. 1 is a drawing showing a configuration of an optical disk reproduction apparatus according to a first exemplary embodiment of the present invention. In FIG. 1, 1 is an optical disk, 2 is an optical pickup module, 3 is an optical pickup unit, 4 is a focus drive coil, 5 is a tracking drive coil, 6 is a spindle motor, 7 is a thread motor, 8 is a servo driver, 9 is a CD reproduction LSI circuit, 10 is an RF amplifier unit, 11 is a servo DSP unit, 12 is a CD signal processor, 13 is a controller, and 14 is an audio DAC unit.

The optical pickup module 2 is provided with the optical pickup unit 3, the focus drive coil 4, and the tracking drive coil 5. The optical pickup unit 3 is driven in a vertical direction (focus direction) by a focus drive signal 25*f* outputted from the servo driver 8, and is driven in a horizontal direction (tracking direction) by a tracking drive signal 25*t*. Furthermore, 4 photodetectors DA to DD are provided, and each thereof reads information recorded on the optical disk as photodetector detection signals SA to SD and output to the RF amplifier unit 10.

The spindle motor 6 is controlled by a spindle drive signal 25*m* outputted from the servo driver 8, and rotates the optical disk 1.

The thread motor 7 is controlled by a thread drive signal 25*s* outputted from the servo driver 8, and moves the optical pickup module 2 circumferentially with respect to the optical disk 1.

The servo driver 8 receives as input a servo drive PWM signal 24 from the CD reproduction LSI circuit 9, and generates and outputs signals for control of a 4 system servo: the thread drive signal 25*s*, the tracking drive signal 25*t*, the focus drive signal 25*f*, and the spindle drive signal 25*m*.

The CD reproduction LSI circuit 9 includes the RF amplifier unit 10, the servo DSP unit 11, the CD processor 12, the controller 13, and the audio DAC unit 14.

The RF amplifier unit 10 generates a sum signal (below, referred to as "RF signal"), based on the photodetector detection signals SA to SD. The RF signal is converted to a reproduction EFM signal 16, which is a digital signal of "0" and "1", and is outputted to the CD signal processor 12. On the other hand, an amplitude detection signal of the RF signal is generated by analog circuit technology followed by convention to digital data, and so converted servo control A/D data 15 converted to digital data is outputted to the servo DSP unit 11.

The servo DSP unit 11 is configured from a digital loop filter or the like, and receives, as input to be processed, the servo control A/D data 15 outputted from the RF amplifier unit 10. Specifically, an RF amplitude detection signal outputted from the RF amplifier unit 10 is compared with threshold data arranged in advance (for example, a value of ¼ of attenuation amount of the RF amplitude) and an RF amplitude attenuation detection signal 21 is generated. The RF amplitude attenuation detection signal 21 is a signal that is at a low level when a threshold is exceeded, and is at a high level when the threshold is not exceeded. Furthermore, a servo drive PWM signal 24 is outputted to the servo driver 8 for 4 system servo control.

The CD signal processor 12 receives as input the reproduction EFM signal 16, performs error correction, and outputs audio reproduction data 22 after error correction to the audio DAC unit 14. In the error correction, a correction operation at an EFM frame period (for reproduction speed with a factor of 1: 7.35 kHz, for instance) is performed, and a C1C2 error signal 17 showing an error correction result is outputted to the controller 13. The C1C2 error signal 17 shows that there has been an error with a high level, and shows that there has not been an error with a low level, for instance. In addition, the CD signal processor 12 outputs an EFM frame clock signal 18, which is a signal showing an EFM frame period, and a SUBQ synchronization signal 19, which is a periodic signal showing an EFM frame of 98 frames, to the controller 13.

The audio DAC unit 14 is configured from a D/A converter, and performs analog conversion processing of audio reproduction data 22 outputted from the CD signal processor 12, to be outputted to the external as an audio reproduction analog signal 23.

The controller 13 switches an RF generation selection signal 20 and outputs to the RF amplifier unit 10. The RF amplifier unit 10 changes a combination of photodetector detection signals of RF signal to be generated, according to the RF generation selection signal 20 that has been received. The controller 13 measures reproduction time of one disk rotation by counting the SUBQ synchronization signals 19 received from the CD signal processor 12, and counts the number of errors of the C1C2 error signal 17 in this time. A judgment is made as to which is a photodetector detection signal with a poor characteristic after the count, and a combination of photodetectors switching when the RF amplification attenuates is stored in a register (a reproduction RF generation selection signal register 38, described below). At reproduction time, the controller 13 receives as input and processes the RF amplitude attenuation detection signal 21 outputted from the servo DSP unit 11, and outputs the RF generation selection signal 20, which is a selection value for generation of the RF signal, to the RF amplifier unit 10.

Figure 2:
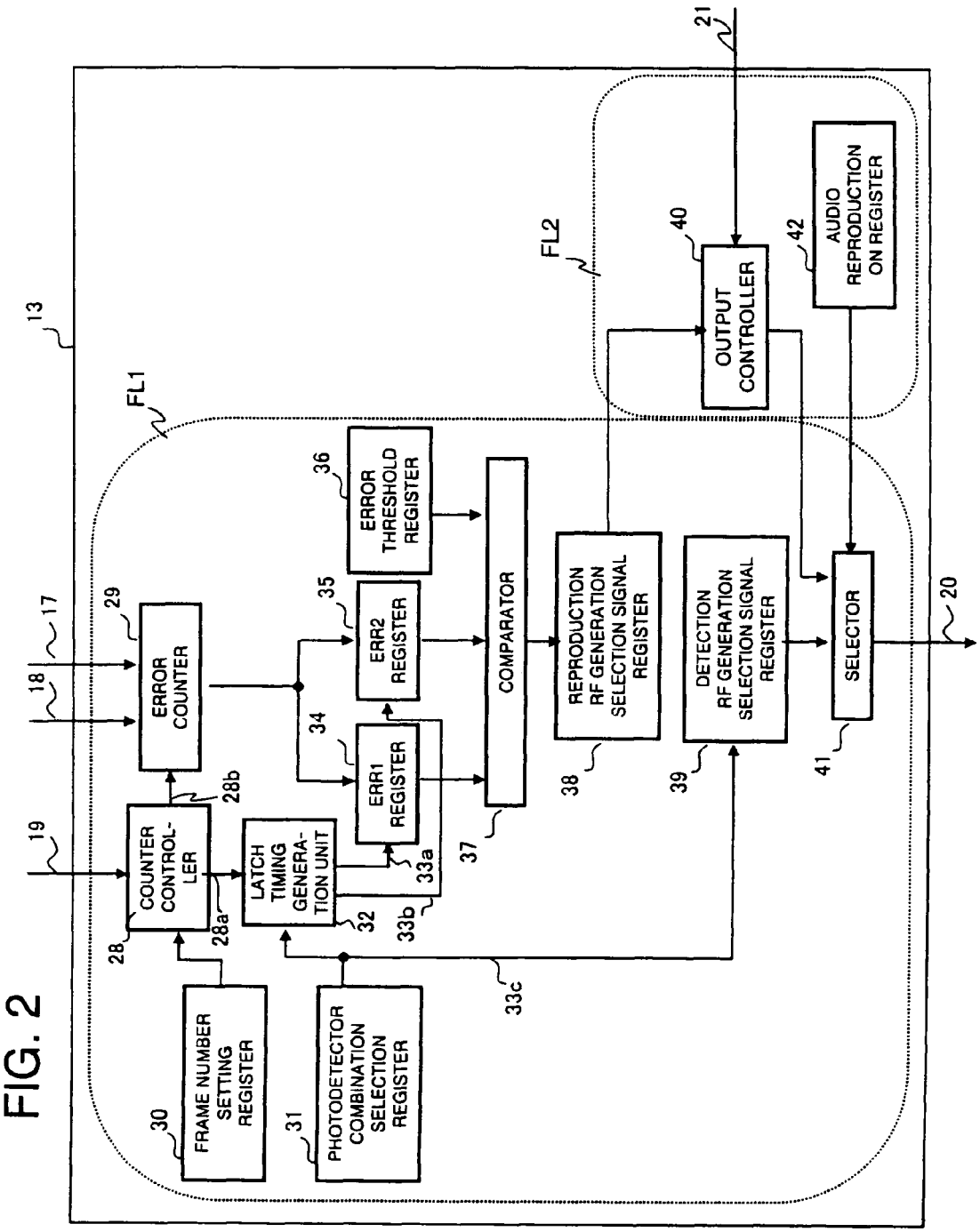
FIG. 2 is a drawing showing a configuration of a controller according to the first exemplary embodiment of the present invention.

Next, a description is given concerning details of the controller 13. FIG. 2 is a drawing showing a configuration of the controller according to the first exemplary embodiment of the present invention and is configured of FL1 section and FL2 section. In FIG. 2, 28 is a counter controller, 29 is an error counter, 30 is a frame number setting register, 31 is a photodetector combination selection register, 32 is a latch timing generation unit, 34 is an ERR1 register, 35 is an ERR2 register, 36 is an error threshold register, 37 is a comparator, 38 is a reproduction RF generation selection signal register, 39 is a detection RF generation selection signal register, 40 is an output controller, 41 is a selector, and 42 is an audio reproduction ON register.

The counter controller 28 receives as input a value of the frame number setting register 30 and the SUBQ synchronization signal 19 from the CD signal processor 12, measures a period in which the errors are counted, and outputs a count clear signal 28b to the error counter 29. Furthermore, a load timing signal 28a for storing an error is generated and outputted to the latch timing generation unit 32.

The error counter 29 receives as input the count clear signal 28b, the C1C2 error signal 17 outputted from the CD signal processor 12 and the EFM frame clock signal 18, and outputs a count result of the number of errors to the ERR1 register 34 and the ERR2 register 35.

The frame number setting register 30 stores the number of EFM frames that counts the errors.

By changing content of the detection RF generation selection signal register 39, the photodetector combination selection register 31 stores and outputs a photodetector combination selection signal 33c for generating an RF signal so that the photodetector combination is changeable.

The latch timing generation unit 32 receives as input the photodetector combination selection signal 33c outputted from the photodetector combination selection register 31 and the load timing signal 28a outputted from the counter controller 28, decodes the photodetector combination selection signal 33c, performs logical product processing with the load timing signal 28a, changes the photodetector combination, and generates latch signals 33a and 33b that are timing signals for storing output values of the error counter 29. The latch signal 33a is outputted to the ERR1 register 34 and the latch signal 33b is outputted to the ERR2 register 35.

The ERR1 register 34 and the ERR2 register 35 change the photodetector combination and store an error count result, which has been counted. The ERR1 register 34 latches output of the error counter 29 by the latch signal 33a, and outputs to the comparator 37. The ERR2 register 35 latches output of the error counter 29 by the latch signal 33b, and outputs to the comparator 37.

The error threshold register 36 stores a threshold for comparing the counted errors. For example, with regard to the threshold, an error value generated by a defect in the disk or the like, which is a cause other than the photodetector characteristic, is stored.

The comparator 37 receives, as input, values of each of the ERR1 register 34, the ERR2 register 35, and the error threshold register 36, compares each of the ERR1 register value and an error threshold register value (described below as error threshold), and the ERR2 register value and the error threshold, selects a photodetector combination in which the error threshold is not exceeded, and outputs to the reproduction RF generation selection signal register 38.

The reproduction RF generation selection signal register 38 stores a result signal from the comparator 37, that is, a photodetector combination selection value in which the threshold is not exceeded, as input, and outputs to the output controller 40.

The detection RF generation selection signal register 39 represents a detection RF generation selection signal by 2 bits, based on the photodetector combination selection signal 33c, and outputs to the selector 41. For example, if the photodetector combination selection signal 33c is "01", the detection RF generation selection signal="01", and an RF selection signal 20="01" is outputted to the RF amplifier unit 10 via the selector 41. Furthermore, if the photodetector combination selection signal 33c is "10", the detection RF generation selection signal="10" is outputted, and the RF selection signal 20="10" is outputted to the RF amplifier unit 10 via the selector 41.

If the RF amplitude attenuation detection signal 21 RF is at a low level, the output controller 40 outputs the detection RF generation selection signal="00", which is an initial value, to the selector 41, and if the RF amplitude attenuation detection signal 21 is at a high level, an output value of the reproduction RF generation selection signal register 38 is outputted to the selector 41.

The selector 41 selects output of the detection RF generation selection signal register 39 at a time of adjustment, such as when starting up or the like, based on a value of the audio reproduction ON register 42, selects output of the output controller 40 at a time of audio reproduction, and outputs the RF generation selection signal 20, which is a selection result, to the RF amplifier unit 10.

The audio reproduction ON register 42 outputs at a high level to the selector 41 at an audio reproduction time, and otherwise outputs at a low level to the selector 41.

Figure 3:
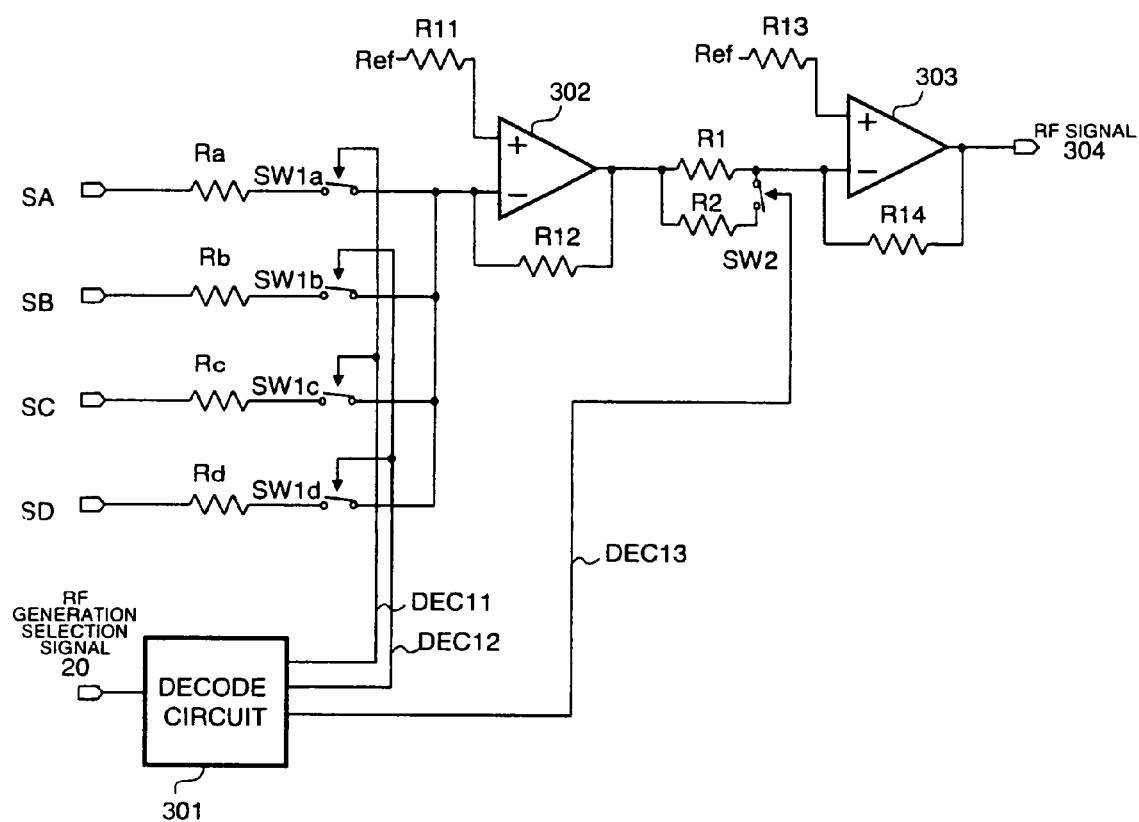
FIG. 3 is a circuit diagram of an RF amplifier unit according to the first exemplary embodiment of the present invention.

Next, a description is given concerning details of the RF amplifier unit 10. FIG. 3 is a circuit diagram of the RF amplifier unit according to the first exemplary embodiment of the present invention. In FIG. 3, 301 is a decode circuit, 302 is a MIXAMP, and 303 is an amplifier.

The decode circuit 301 decodes the RF generation selection signal 20 according to a truth table shown in FIG. 4, and outputs signals DEC11 to DEC13 that are a decoding result. The DEC11 signal is given to switches SW1a and SW1c. The switches SW1a and SW1c are ON when the signal DEC11 is at a high level, and are OFF when the signal DEC11 is at a low level. The DEC12 signal is given to switches SW1b and SW1d. The switches SW1b and SW1d are ON when the signal DEC12 is at a high level, and are OFF when the signal DEC12 is at a low level. The DEC13 signal is given to the switch SW2. The switch SW2 is ON when the signal DEC13 is at a high level, and is OFF when the signal DEC13 is at a low level.

The photodetector detection signals SA to SD outputted from the optical pickup module 2 are supplied to one end of each of the switches SW1a to SW1d, via respective resistors Ra to Rd.

The MIXAMP 302 has a reference voltage Ref as input of a + terminal (non-inverting input terminal) via a resistor R11, and has the other end of the connection switches SW1a to SW1d commonly as input of a − terminal (inverting input terminal). The resistor R12 connects the − terminal and an output terminal of the MIXAMP 302. The MIXAMP 302 combines (adds) the selected photodetector detection signals SA to SD.

The output terminal of the MIXAMP 302 is connected to a terminal of the amplifier 303 via a parallel connection circuit of the resistor R1 and a series circuit of the switch SW2 and the resistor R2. The switch SW2 switches gain of output of the MIXAMP 302. When the switch SW2 is ON, the output gain of the MIXAMP 302 is doubled, and when OFF, the gain is unchanged.

The amplifier 303 inverts and amplifies the output of the MIXAMP 302, and outputs an RF signal 304. The amplifier 303 has the reference voltage Ref as input of a + terminal (non-inverting input terminal) via a resistor R13, and connects the resistor R14 between a − terminal and an output terminal. An RF signal 304, which is an output signal of the amplifier 303, as shown in FIG. 4, is combined with a photodetector, based on a value of the RF generation selection signal 20.

As described above, a combination of the photodetector detection signals SA to SD is selected based on a decode result of the RF generation selection signal 20, and after combining is performed by the MIXAMP 302 and gain adjustment by the amplifier 303, the combination is outputted as the RF signal 304. The RF signal 304 is converted to a digital signal, and is outputted to the CD signal processor 12 as a reproduction EFM signal 16 from the RF amplifier 10. Furthermore, an amplitude detection signal of the RF signal 304 is generated, as converted digital data, and outputted to the servo DSP unit 11 as the servo control A/D data 15.

Next, using FIG. 1, a description is given concerning overall operation of the optical disk reproduction apparatus.

When disk reproduction is started, the optical disk 1 is loaded on the spindle motor 6, and rotation of the optical disk 1 is begun by the spindle servo. After that, the thread motor 7 is driven, and the optical pickup module 2 moves to an innermost circumference of the disk. When the optical pickup module 2 reaches the innermost circumference, a focus search operation is executed by a focus drive signal 25f outputted from the servo driver 8, and a laser beam is focused on a recording surface of the optical disk 1 by the focus servo. A reproduction state is then formed by the tracking servo and the thread servo.

After starting disk reproduction, the controller 13 operates in accordance with steps S101 to S109 of a flowchart shown in FIG. 5, to be described later. That is, the RF generation selection signal 20 is switched, the combination of the photodetector detection signals SA to SD in the RF amplifier unit 10 is changed, and the RF signal is generated. With regard to the reproduction EFM signal 16 generated based on the RF signal, an error correction operation is performed by the CD signal processor 12. The C1C2 error signal 17 showing an error correction state is counted for a fixed time period in the controller 13. After ending the count a judgment is made as to which is a photodetector detection signal with a poor characteristic, and a combination of the photodetector detection signals, switched when RF amplitude is attenuated, is stored in the reproduction RF generation selection signal register 38.

Next, at a time of audio reproduction, the controller 13 operates in accordance with steps S21 to S26 of the flowchart of FIG. 5, to be described later. That is, the RF amplification attenuation detection signal 21 outputted from the servo DSP unit 11 is received by the controller 13, and converted to the RF generation selection signal 20, in accordance with the flowchart shown in FIG. 5. The generated RF generation selection signal 20 is supplied to the RF amplifier unit 10, and a desired photodetector is selected.

Next, a description is given of operation of the controller 13. Operation of the FL1 section of FIG. 2 is performed after starting of the disk reproduction; a setting of the photodetector combination selection register 31 is changed; the RF generation selection signal 20 is switched; and the RF signal is generated. For example, the RF signal is generated by the photodetector detection signals SA and SC.

The generated RF signal is supplied to the CD signal processor 12 and, through the C1C2 error signal 17, is received by the error counter 29, so that the quantity of errors is counted. The C1C2 error signal 17 is updated at timing of the EFM frame clock signal 18. The counter controller 28, by counting a period of the SUBQ synchronization signal 19 showing EFM frames, measures a time period of 1 disk rotation, outputs a count clear signal 28b to the error counter 29, and outputs a load timing signal 28a to the latch timing generation unit 32.

At timing of the latch signal 33a outputted from the latch timing generation unit 32, the number of errors is stored in the ERR1 register 34, and at timing of the latch signal 33b, the number of errors is stored in the ERR2 register 35. If the error count ERR1 in a case of generating the RF signal by the photodetector detection signals SA and SC, and the error count ERR2 in a case of generating the RF signal by the photodetector detection signals SB and SD ends, the comparator 37 compares, respectively, the ERR1 register value with the error threshold, and the ERR2 register value with the error threshold.

A count is made of how many cases there are where the error threshold is exceeded (ERRn>error threshold) (n=1, 2), and if 1, a photodetector combination in which the error threshold is not exceeded is selected. That is, if "ERR1<error threshold" and "ERR2>error threshold", a judgment is made of deterioration of a characteristic of the photodetector detection signal SB or SD, and an RF generation selection value in which an RF signal is generated by the photodetector detection signals SA and SC is outputted.

If a comparison result is that "ERR1>error threshold" and "ERR2<error threshold", a judgment is made of deterioration of a characteristic of the photodetector detection signal SA or SC, and an RF generation selection value that generates an RF signal by the photodetector detection signals SB and SD is outputted. Furthermore, in a case where the number of ERRn in which the error threshold is exceeded is not 1, an initial value remains as it is.

In operation in the FL2 section of FIG. 2, output of the audio reproduction ON register 42 at a time of audio reproduction is at a high level, and output of the selector 41 is an output value of the output controller 40. The output controller 40 makes reference to a value of the reproduction RF generation selection signal register 38 that has been processed in the FL1 unit of FIG. 2, and switches the RF selection signal by the RF amplification attenuation detection signal 21 outputted from the servo DSP unit 11. That is, if the RF amplification attenuation detection signal 21 is at a low level, the detection RF generation signal="00", which is an initial value, is outputted. The RF selection signal 20 is decoded by the RF amplifier unit 10, and an RF signal that is a sum of photodetector detection signals shown in Equation (1) is generated.

$$RF\ signal = (SA + SB + SC + SD) \qquad \text{Equation (1)}$$

If the RF amplification attenuation detection signal 21 is at a high level, an output value of the reproduction RF generation selection signal register 38 is selected.

Figure 5:
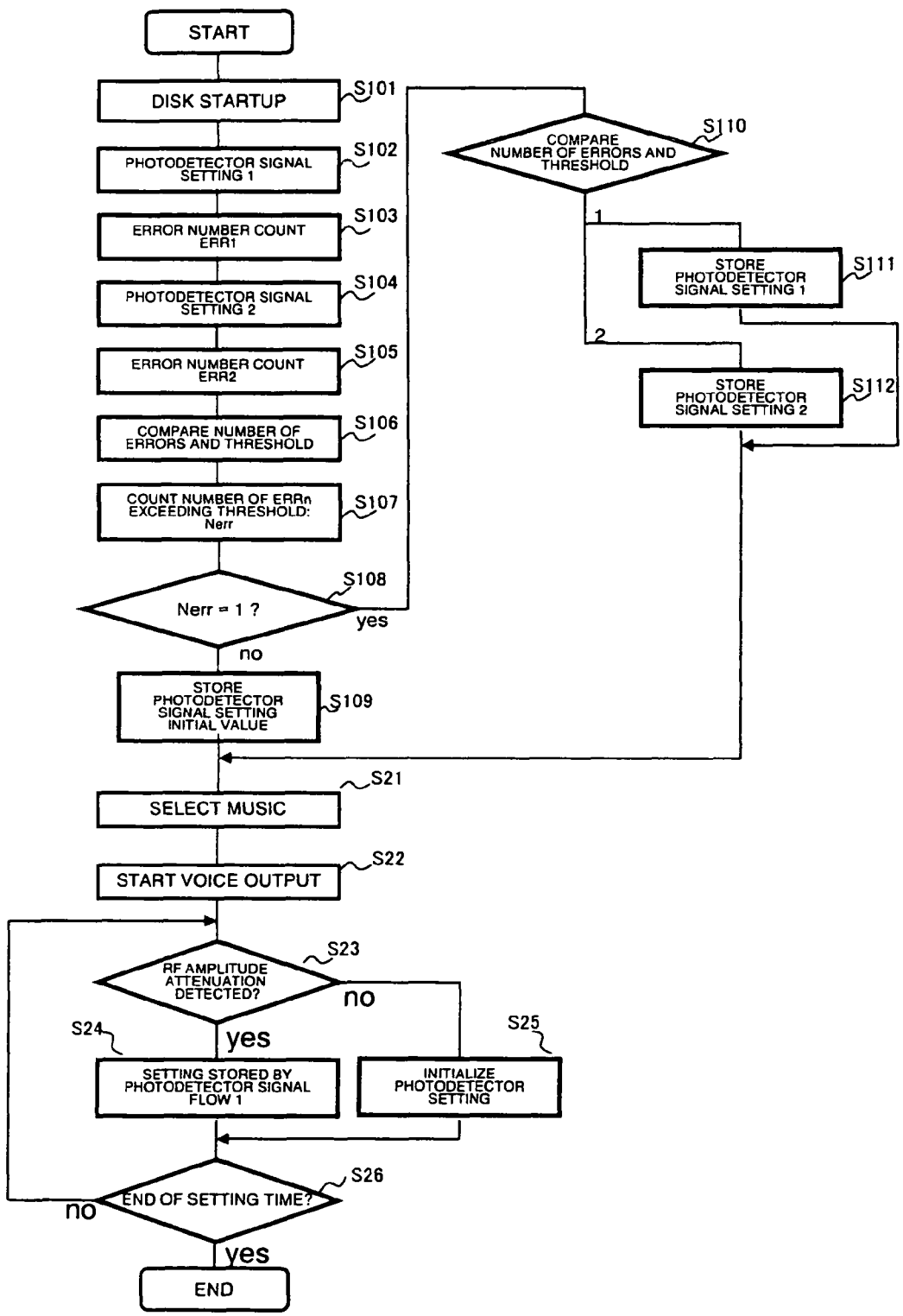
FIG. 5 is a flowchart representing operation of the optical disk reproduction apparatus according to the first exemplary embodiment of the present invention.

Next, a description is given of operation of the controller 13, using the flowchart of FIG. 5.

In the optical disk reproduction apparatus a disk is mounted and is in a reproducible state (step S101).

After that, the controller 13 performs setting of the photodetector combination selection register 31, and switches the RF generation selection signal 20 to generate the RF signal (step S102).

For example, the RF signal is generated by the photodetector detection signals SA and SC, and the C1C2 error signal 17 outputted from the CD signal processor 12 is counted by the error counter 29, and stored in the ERR1 register 34 (step S103).

Next, the controller 13 changes setting of the photodetector combination selection register 31, and switches the RF generation selection signal 20 to generate the RF signal (step S104).

For example, the RF signal is generated by the photodetector detection signals SB and SD, and the C1C2 error signal 17 outputted from the CD signal processor 12 is counted by the error counter 29, and stored in the ERR2 register 35 (step S105).

The comparator 37 compares respective ERRn register values (n=1, 2) and the error threshold (step S106).

The number (Nerr) of ERRn that exceed the error threshold is counted (step S107).

In a case where Nerr is not 1 ("no" in step S108), an initial value of photodetector setting is stored (step S109).

In a case where Nerr is 1 ("yes" in step S108), reference is made to a comparison result again, and a combination of photodetectors not exceeding the threshold is selected (step S110).

In step S110, branch condition 1 is "ERR1<error threshold, and ERR2>error threshold", and branch condition 2 is "ERR1>error threshold, and ERR2<error threshold". For each thereof, a photodetector signal setting is stored in the reproduction RF generation selection signal register 38 according to a comparison result (step S111 and step S112).

Next, a music selection operation of moving to a target track for audio reproduction is performed (step S21).

If the target track is reached, the audio reproduction ON register 42 outputs at a high level, and the reproduction RF generation selection signal="00", which is an initial value, is outputted. The RF amplifier unit 10 decodes the RF generation selection signal 20, and generates the RF signal based on Equation (1). Audio reproduction is performed, and the audio reproduction analog signal 23 is outputted from the audio DAC unit 14 (step S22).

The output controller 40 monitors the RF amplitude attenuation detection signal 21 (step S23), and if the RF amplitude attenuation detection signal 21 is at a low level ("no" in step S23), the reproduction RF generation selection signal="00", which is an initial value, is outputted (step S25). If the RF amplitude attenuation detection signal 21 is at a high level ("yes" in step S23), the output value of the reproduction RF generation selection signal register 38 is selected and outputted (step S24).

The RF amplifier unit 10 decodes the RF generation selection signal 20, and generates the RF signal. Operations from step S23 to step S25 are executed until reproduction time is ended ("yes" in step S26). Judgment of ending of reproduction time is done by managing reproduction time information, known as subcodes in conventional technology.

Figure 6:
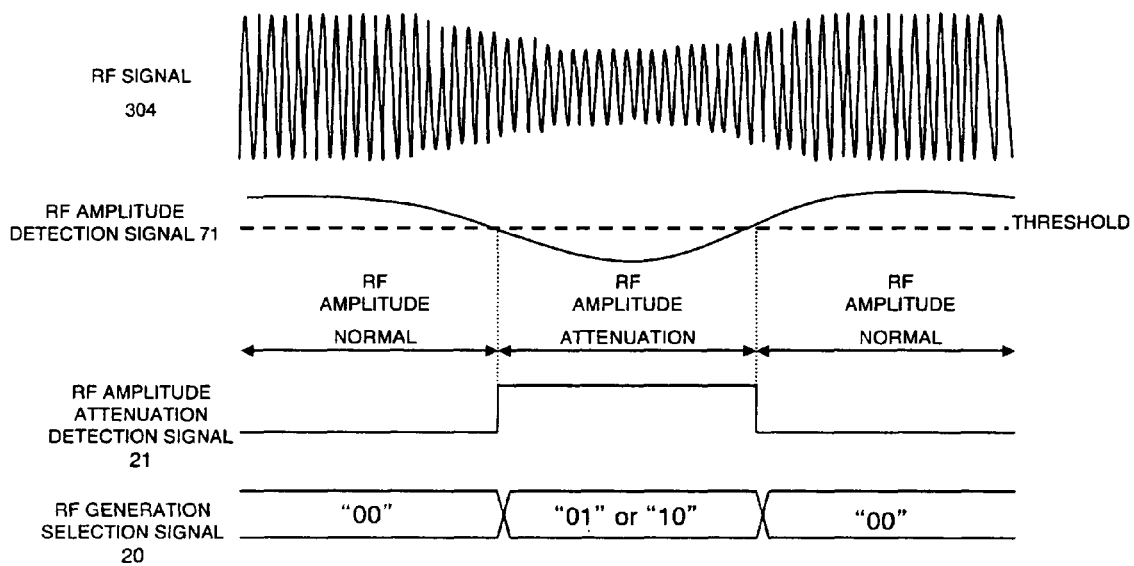
FIG. 6 is a timing chart at a time of amplitude attenuation of an RF signal in the optical disk reproduction apparatus according to the first exemplary embodiment of the present invention.

FIG. 6 shows timing of generating a surface wobble or the like at a time of audio reproduction, and timing of RF signal switching when amplitude of the RF signal 304 is attenuated. A horizontal axis shows elapsed time, and transition of the RF signal 304 from a state in which the amplitude is normal to an attenuated state, and back to a normal state, is shown.

In a period in which the amplitude of the RF signal 304 is normal, the RF amplitude detection signal 71, showing an amplitude value of the RF signal, is greater than or equal to a threshold, and the RF amplitude attenuation detection signal 21 indicates a low level. The controller 13 judges that the RF amplitude attenuation detection signal 21 is at a low level, and outputs the RF generation selection signal 20="00" to the RF amplifier unit 10. The RF amplifier unit 10 decodes the RF generation selection signal 20, and generates the RF signal, which is the sum (SA+SB+SC+SD) of the photodetector detection signals indicated by Equation (1).

Next, in a time period in which surface wobble or the like occurs and the amplitude of the RF signal 304 is attenuated, the RF amplitude detection signal 71 is less than the threshold, and the RF amplitude attenuation detection signal 21 indicates a high level. The controller 13 judges that the RF amplitude attenuation detection signal 21 is at a high level, makes reference to a value of the reproduction RF generation selection signal register 38, and outputs the RF generation selection signal 20="01" or "10" to the RF amplifier unit 10.

The RF amplifier unit 10 decodes the RF generation selection signal 20, and generates the RF signal that is generated by removing photodetector components having a poor characteristic (RF signal=(SA+SC)*2, or (SB+SD)*2).

When there is again a time period in which the amplitude of the RF signal 304 is normal, the RF amplitude attenuation detection signal 21 indicates a low level. The controller judges that the RF amplitude attenuation detection signal 21 is at a low level, and outputs the RF generation selection signal 20="00" to the RF amplifier unit 10. The RF amplifier unit 10 decodes the RF generation selection signal 20, and generates the RF signal that is the sum of the photodetectors.

Moreover, in the flowchart of FIG. 5, in a case where RF amplitude attenuation is detected, switching to an RF signal that is generated by removing photodetector components with a poor characteristic is performed. However, there is no limitation to this, and ordinarily, during an audio reproduction time period, reproduction may be performed with an RF signal that is generated by removing photodetector components with a poor characteristic.

In the above, a description has been given such that the RF signal is generated based on 2 signals in which a combination of photodetector detection signals is either the photodetector detection signals SA and SC or the photodetector detection signals SB and SD. However, the combination is not limited to this, and may be composed such that the RF signal is generated based on 2 signals of either the photodetector detection signals SA and SD or the photodetector detection signals SB and SC, or on 2 signals of either the photodetector detection signals SA and SB or the photodetector detection signals SC and SD. That is, as a combination of the photodetectors, the RF signal may be generated by selecting whichever of either a sum of output signals of 2 among 4 photodetectors, or a sum of output signals of the other 2 photodetectors has fewer error corrections.

EXEMPLARY EMBODIMENT 2

In an optical disk reproduction apparatus according to a second exemplary embodiment of the present invention a configuration of a controller 13 shown in FIG. 2 is modified, and a combination of photodetectors, which generate an RF signal, handle 1 further signal each. That is, in a method of generating an RF signal, the RF signal is generated, for example, from photodetector detection signals SA, SB, and SC, with a photodetector detection signal SD removed, errors are counted, and errors are also counted in the same way for other photodetector detection signal(s). An error count result for all the photodetector detection signals is obtained, and finally if a result in which an error rate has deteriorated with a combination including the photodetector detection signal SD is obtained, the RF signal used at a time of audio reproduction is generated by combining 3 photodetector detection signals as shown in Equation (2).

RF signal=($SA+SB+SC$)*4/3    Equation (2)

Figure 7:
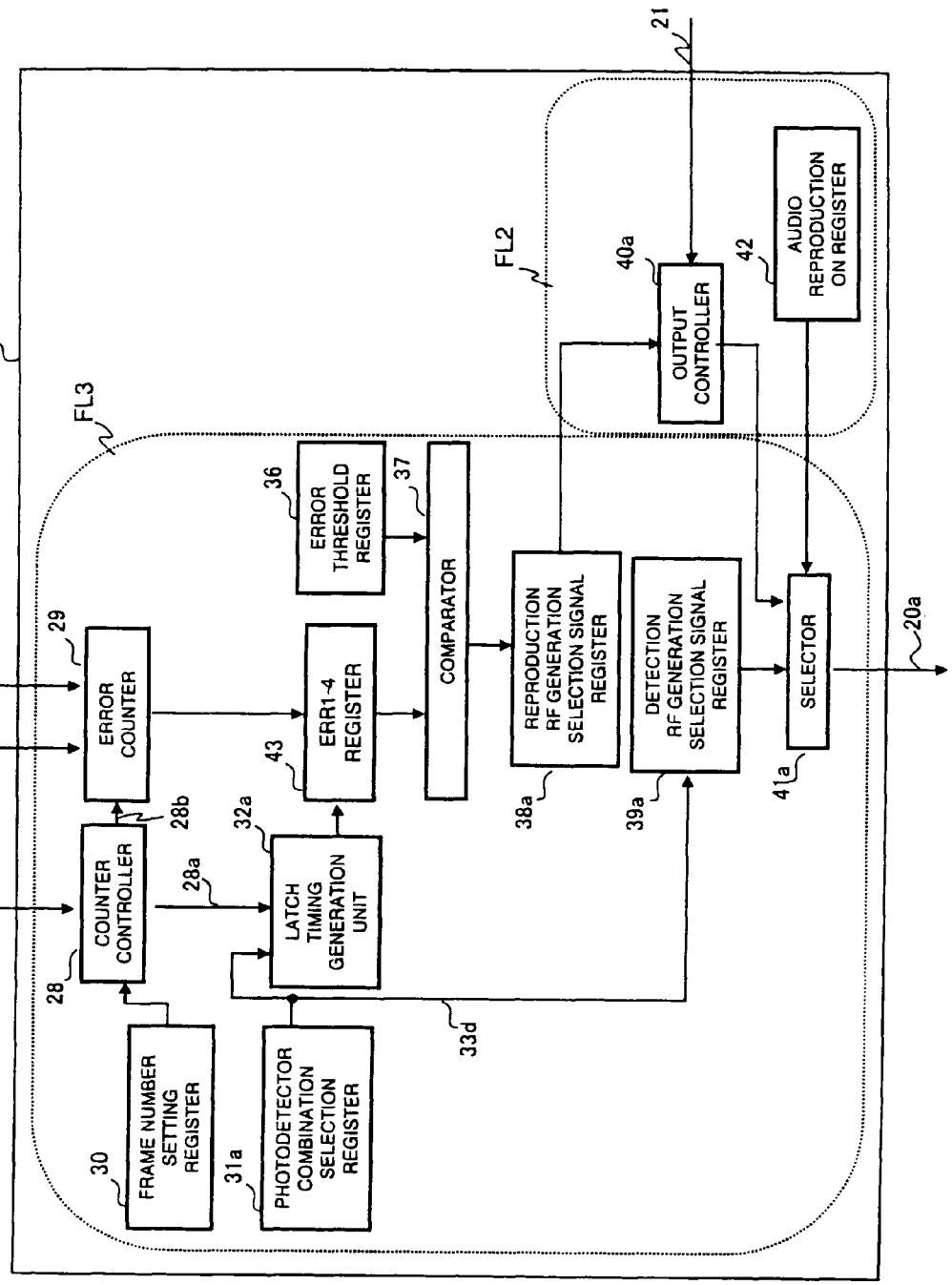
FIG. 7 is a drawing showing a configuration of a controller according to a second exemplary embodiment of the present invention.

FIG. 7 is a drawing showing a configuration of the controller according to the second exemplary embodiment of the present invention. In FIG. 7, reference symbols the same as in FIG. 2 represent the same items and descriptions thereof are omitted. A part that differs from FIG. 2 is the point that a value of the photodetector combination selection register 31a is expanded from 2 bits to 3 bits by the photodetector combination increasing from 2 types to 4 types. Furthermore, ERR1 register 34 and ERR2 register 35 that store error numbers are changed to an ERR1-4 register 43, which is provided with 4 register functions. Furthermore, a latch timing generation circuit 32a is modified so as to generate timing of storing ERR1 to ERR4 that are of 4 types.

Furthermore, data range becomes 3 bits for a reproduction RF generation selection signal register 38a, a detection RF generation selection signal register 39a, an output controller 40a, a selector 41a, and an RF generation selection signal 20a. With regard to the meaning of 3 bit data, "001" means that the RF signal is generated by a combination of the photodetector detection signals SB, SC, and SD; "010" means that the RF signal is generated by a combination of the photodetector detection signals SA, SC, and SD; "011" means that the RF signal is generated by a combination of the photodetector detection signals SA, SB, and SD; and "100" means that the RF signal is generated by a combination of the photodetector detection signals SA, SB, and SC. Moreover, "000" means generation by a sum (SA+SB+SC+SD) of the photodetector detection signals shown in Equation (1).

Figure 8:
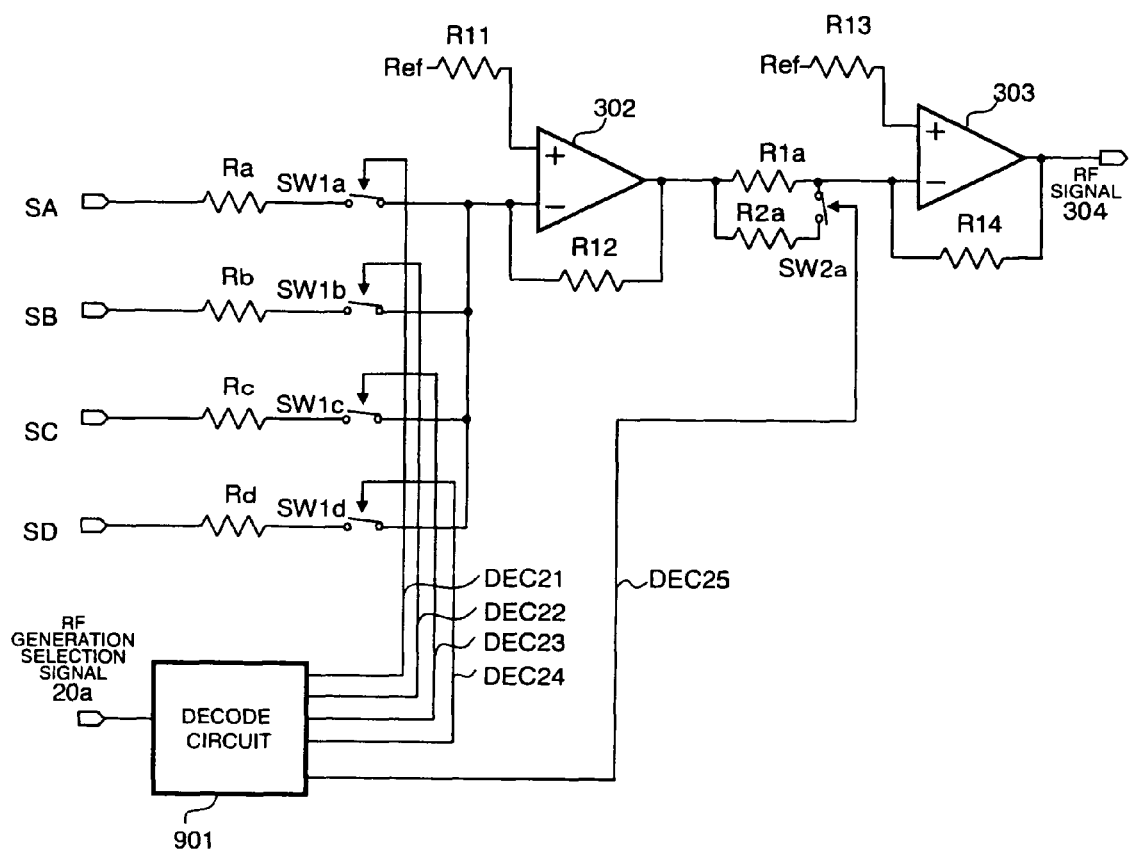
FIG. 8 is a circuit diagram of an RF amplifier unit according to the second exemplary embodiment of the present invention.

FIG. 8 is a circuit diagram of the RF amplifier unit according to the second exemplary embodiment of the present invention. In FIG. 8, reference symbols the same as in FIG. 3 represented the same items and descriptions thereof are omitted. A part that differs from FIG. 3 is that signals DEC21 to DEC24, obtained by a decode circuit 901 decoding an RF generation selection signal 20a, are supplied to control terminals of each of switches SW1a to SW1d. Furthermore, resistors R1a and R2a for adjusting gain, connected to the switch SW2a controlled by a signal DEC 25 are set to have resistance values such that when the switch SW2a is ON, output gain of a MIXAMP 302 increases by a factor of 4/3.

The switch SW2a switches the output gain of the MIXAMP 302; a switch is ON with a signal DEC 25 at a high level, and output gain of the MIXAMP 302 increases by a factor of 4/3. A switch is OFF with the signal DEC 25 at a low level, and output gain of the MIXAMP 302 has a factor of 1.

FIG. 9 shows a truth table for a decode circuit 901. This truth table shows combinations of the photodetector detection signals SA to SD of the generated RF signal, with respect to values of the 3 bit RF generation selection signal 20a.

Next, a description is given of operation of the controller 13 using FIG. 7. With regard to FIG. 7, an FL3 section of FIG. 7 differs from the FL1 section of FIG. 2 of the first exemplary embodiment; operation is performed after starting of disk reproduction, a setting of a photodetector combination selection register 31a is changed as desired, and the RF generation selection signal 20a is switched, to generate the RF signal. For example, the RF signal is generated by the photodetector detection signals SB, SC, and SD, and a C1C2 error signal 17 outputted from a CD signal processor 12 is counted by an error counter 29. The C1C2 error signal 17 is updated at timing of an EFM frame clock signal 18. In a counter controller 28, a time period of 1 disk rotation is measured by counting a period of a SUBQ synchronization signal 19 showing EFM frames, a count clear signal 28b is outputted to the error counter 29, and a load timing signal 28a is outputted to a latch timing generation unit 32a.

If a count of the number of errors ERR1 in a case of generating the RF signal by the photodetector detection signals SB, SC, and SD, the number of errors ERR2 in a case of generating the RF signal by the photodetector detection signals SA, SC, and SD, the number of errors ERR3 in a case of generating the RF signal by the photodetector detection signals SA, SB, and SD, and the number of errors ERR4 in a case of generating the RF signal by the photodetector detection signals SA, SB, and SC, is ended, the comparator 37 performs comparisons of each latched value related to ERR1 to ERR 4 in the ERR1-4 register, with an error threshold.

Next, a count is made of how many cases of ERRn there are where the error threshold is exceeded, and if there are 3, a photodetector combination in which the error threshold is not exceeded is selected. That is, if "ERR1<error threshold" and otherwise "ERRn (n=2 to 4)>error threshold", it is assumed that there is deterioration of a characteristic of the photodetector detection signal SA, and the photodetector detection signals SB, SC, and SD are generated, to output an RF generation selection value. In the same way, a judgment is made of cases of each of ERRn (n=2 to 4), and a photodetector combination in which the error threshold is not exceeded is selected. In a case where the number of ERRn in which the error threshold is exceeded is not 3, an initial value (conventional generation method) remains as it is. With regard to the FL2 section, operation is the same as in the first exemplary embodiment.

Figure 10:
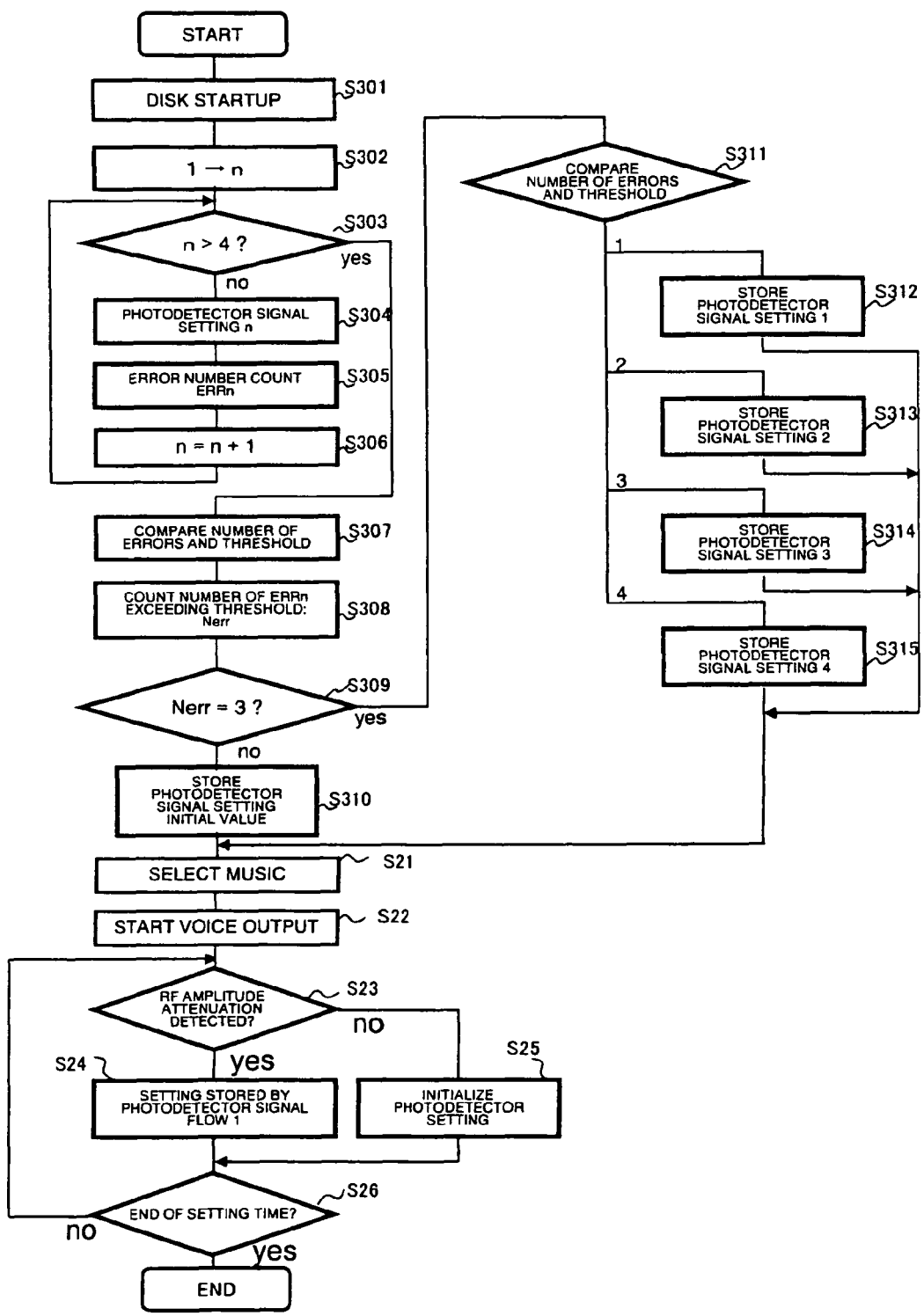
FIG. 10 is a flowchart representing operation of the optical disk reproduction apparatus according to the second exemplary embodiment of the present invention.

Next, an operation sequence of a block diagram of FIG. 7 is described using a flowchart of FIG. 10. In the flowchart of FIG. 10, a judgment is made as to which is a photodetector detection signal with a poor characteristic from starting of disk reproduction, similar to the flowchart of FIG. 5, and the flowchart of FIG. 10 shows processing until a combination that switches when an RF amplitude has been attenuated is stored in a register.

After a disk is mounted and is in a reproducible state (step S301), setting of a photodetector combination selection register 31a is changed as desired (arbitrarily), and the RF generation selection signal 20a is switched to generated the RF signal (steps S302 to S306). For example, in a case of n=1, the RF signal is generated by the photodetector detection signals SB, SC, and SD (step S304), and the C1C2 error signal 17 outputted from the CD signal processor 12 is counted by the error counter 29, and stored in the ERR1 to ERR4 registers 43 (step S305). Next, the n value is incremented (step S306), and the number of errors is counted in the same way.

Next, in the comparator 37 each of the ERRn register values and the error threshold are compared, and a count (Nerr) is made of how many ERRn there are in which the error threshold is exceeded (step S308).

In a case where Nerr is not 3 ("no" in step S309), an initial value of photodetector setting is stored (step S310). In a case where Nerr is 3 ("yes" in step S309), reference is made to a comparison result again, and a combination of photodetectors not exceeding the threshold is selected (step S311).

In step S311, branch condition 1 expresses that "ERR1<error threshold, and ERRn (n=2 to 4)>error threshold"; branch condition 2 expresses that "ERR2<error threshold, and ERRn (n=1, 3, 4)>error threshold", branch condition 3 expresses that "ERR3<error threshold, and ERRn (n=1, 2, 4)>error threshold", and branch condition 4 expresses that "ERR4<error threshold and ERRn (n=1 to 3)>error threshold. A photodetector signal setting based on the comparison result is stored in the reproduction RF generation selection signal register 38a (steps S312 to S315).

Step S21 to step S26 have the same content as processing of each of the same reference symbols in FIG. 5, and descriptions thereof are omitted.

In the optical disk reproduction apparatus operating as above, even if a characteristic of any one signal component among 4 photodetector detection signals outputted from the optical pickup module is poor, by generating an RF signal with the poor characteristic component removed, processing equivalent to the first exemplary embodiment is possible.

In the first exemplary embodiment, the RF signal is generated by selecting whichever having fewer error corrections, among the sum of output signals of 2 among 4 photodetectors, and the sum of output signals of the remaining 2. As a result, even in a case where a characteristic of only one of the photodetector detection signals is poor, the other photodetector detection signal that does not have a problem is not used, too.

In contrast to this, according to the optical disk reproduction apparatus of the present exemplary embodiment, by further narrowing down to one photodetector with a poor characteristic, generation of the RF signal uses 3 photodetector detection signals. Therefore, reflected light spot area is enlarged, and thus become comparable to an RF signal component generated by 4 photodetector detection signals.

Furthermore, the various disclosures of the abovementioned Patent Document are incorporated herein by reference thereto. Modifications and adjustments of embodiments and examples are possible within the bounds of the entire disclosure (including the scope of the claims) of the present invention, and also based on fundamental technological concepts thereof. Furthermore, a wide variety of combinations and selections of various disclosed elements are possible within the scope of the claims of the present invention. That is, the present invention clearly includes every type of transformation and modification that a person skilled in the art can realize according to technological concepts and the entire disclosure including the claims.

What is claimed is:

1. An optical disk reproduction apparatus comprising:
   a plurality of photodetectors;
   an RF amplifier unit that selects a combination of output signals of said plurality of photodetectors to generate an RF signal; and
   a controller that obtains an error correction result of a reproduced signal, which is reproduced based on said RF signal generated while changing said combination at startup time, and that determines said combination at reproduction time in accordance with said obtained error correction result, to be given to said RF amplifier unit.

2. The optical disk reproduction apparatus according to claim 1, wherein said controller comprises:
   a counter that counts for a fixed time period said error correction result, per combination of said photodetectors;
   a comparator that compares a count result of said counter with a threshold set in advance; and
   an output controller that judges whether or not to use a combination of said photodetectors based on a comparison result of said comparator, and that performs change control of the combination of said photodetectors.

3. The optical disk reproduction apparatus according to claim 1, wherein
   said plurality of photodetectors comprises 4 photodetectors, with 2 photodetectors being arranged on each of an inner circumferential side and an outer circumferential side of a track;
   said combination at reproduction time is formed by selecting whichever of either a sum of output signals of 2 photodetectors among said 4 photodetectors, or a sum of output signals of 2 other photodetectors thereof has fewer error corrections; and
   said RF amplifier unit, for a case in which all of said 4 photodetectors are selected, doubles degree of amplification of a photodetector output signal.

4. The optical disk reproduction apparatus according to claim 2, wherein
   said plurality of photodetectors comprises 4 photodetectors, with 2 photodetectors being arranged on each of an inner circumferential side and an outer circumferential side of a track;

said combination at reproduction time is formed by selecting whichever of either a sum of output signals of 2 photodetectors among said 4 photodetectors, or a sum of output signals of 2 other photodetectors thereof has fewer error corrections; and said RF amplifier unit, for a case in which all of said 4 photodetectors are selected, doubles degree of amplification of a photodetector output signal.

5. The optical disk reproduction apparatus according to claim 1, wherein said plurality of photodetectors is formed of 4 photodetectors, with 2 photodetectors being arranged on each of an inner circumferential side and an outer circumferential side of a track;

said combination at reproduction time is formed by selecting 3 photodetectors that have fewer reproduced signal error corrections; and said RF amplifier unit, for a case in which all of said 4 photodetectors are selected, increases degree of amplification of a photodetector output signal by a factor of 4/3.

6. The optical disk reproduction apparatus according to claim 2, wherein said plurality of photodetectors is formed of 4 photodetectors, with 2 photodetectors being arranged on each of an inner circumferential side and an outer circumferential side of a track;

said combination at reproduction time is formed by selecting 3 photodetectors that have fewer reproduced signal error corrections; and said RF amplifier unit, for a case in which all of said 4 photodetectors are selected, increases degree of amplification of a photodetector output signal by a factor of 4/3.

7. The optical disk reproduction apparatus according to claim 1, wherein, by counting a SUBQ synchronization signal as input; reproduction time of one disk rotation is measured to obtain a fixed time period; and said counter counts number of errors of a C1C2 error signal in said fixed time period as an error correction result.

8. The optical disk reproduction apparatus according to claim 2, wherein, by counting a SUBQ synchronization signal as input; reproduction time of one disk rotation is measured to obtain a fixed time period; and said counter counts number of errors of a C1C2 error signal in said fixed time period as an error correction result.

9. An optical disk reproduction method for an optical disk reproduction apparatus comprising: selecting a combination of output signals of a plurality of photodetectors to generate an RF signal, and outputting a reproduced signal, which is reproduced based on said RF signal;

said method further comprising:

obtaining an error correction result of said reproduced signal, which is reproduced based on said RF signal while changing a combination of output signals of said plurality of photodetectors at startup time;

determining said combination at reproduction time in accordance with said obtained error correction result; and outputting said reproduced signal obtained based on said determined combination.

* * * * *